(12) United States Patent
Jinsong (10) Patent No.: US 7,863,902 B2
(45) Date of Patent: *Jan. 4, 2011

(54) COHERENT IN-PHASE DEMODULATION FOR RESISTIVITY IMAGE TOOLS WITH SPREAD SPECTRUM CONTINUOUS PHASE MODULATION STIMULUS

(75) Inventor: Zhao Jinsong, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 268 days.

This patent is subject to a terminal disclaimer.

(21) Appl. No.: 12/177,380

(22) Filed: Jul. 22, 2008

(65) Prior Publication Data

US 2009/0322336 A1 Dec. 31, 2009

Related U.S. Application Data

(63) Continuation-in-part of application No. 12/165,264, filed on Jun. 30, 2008.

(51) Int. Cl.
*G01V 3/18* (2006.01)
*G01V 3/02* (2006.01)
*G01V 3/30* (2006.01)

(52) U.S. Cl. ............ 324/355; 324/347; 324/373

(58) Field of Classification Search ......... 324/347, 324/354–357, 360–363, 366–370, 373–375; 175/50

See application file for complete search history.

(56) References Cited

U.S. PATENT DOCUMENTS

| 4,951,263 | A | * | 8/1990 | Shope | ............... | 367/2 |
|---|---|---|---|---|---|---|
| 5,075,863 | A | * | 12/1991 | Nagamune et al. | ........ | 702/159 |
| 6,975,121 | B2 | * | 12/2005 | Strack et al. | ........ | 324/347 |
| 7,034,539 | B2 | * | 4/2006 | Ueda et al. | ........ | 324/357 |
| 7,579,841 | B2 | * | 8/2009 | San Martin et al. | ........ | 324/366 |

* cited by examiner

*Primary Examiner*—Bot L LeDynh
(74) *Attorney, Agent, or Firm*—Charles S. Knobloch; Gordon T. Arnold; Arnold & Knobloch, L.L.P.

(57) ABSTRACT

A method and system for measuring formation resisitivity is achieved by introducing one or more continuous phase modulated electrical signals into the formation, each signal introduced at a different location. The current of each introduced electrical signal is then sensed, producing an analog voltage signal as a measurement of the formation. Each introduced electrical signal is compared with its respective measured signal of the formation. Each comparison is made in a quadrature demodulation device, producing an in-phase demodulated signal. A quasi-direct-current signal is extracted from each in-phase demodulated signal, producing an analog measurement related to the resistivity of the formation. Each analog measurement is converted into a digital value for further processing. Successive measurements are digitally summed and averaged to increase the signal to noise ratio.

12 Claims, 8 Drawing Sheets

COHERENT IN-PHASE DEMODULATION FOR RESISTIVITY IMAGE TOOLS WITH SPREAD SPECTRUM CONTINUOUS PHASE MODULATION STIMULUS

FIELD OF THE INVENTION

The present invention relates generally to hydrocarbon exploration and production, and more particularly relates to a logging method and system for determining earth formation resistivity.

BACKGROUND

Resistivity logging measures the electrical resistivity of formations surrounding an earth borehole. Resistivity logging is a commonly used technique of formation evaluation. For example, porous formations having high resistivity generally indicate the presence of hydrocarbons, while porous formations having low resistivity are generally water saturated. A logging device is lowered in the well bore on a wireline cable and measurements are taken with the device as the cable is withdrawn. One technique of resistivity logging uses electrodes. For example, button electrodes are used on a pad which is placed in close proximity to the borehole wall. A measured current flows in a circuit that connects a current source to one electrode, through the earth formation to a return electrode and back to the current source in the logging tool.

Figure 1:
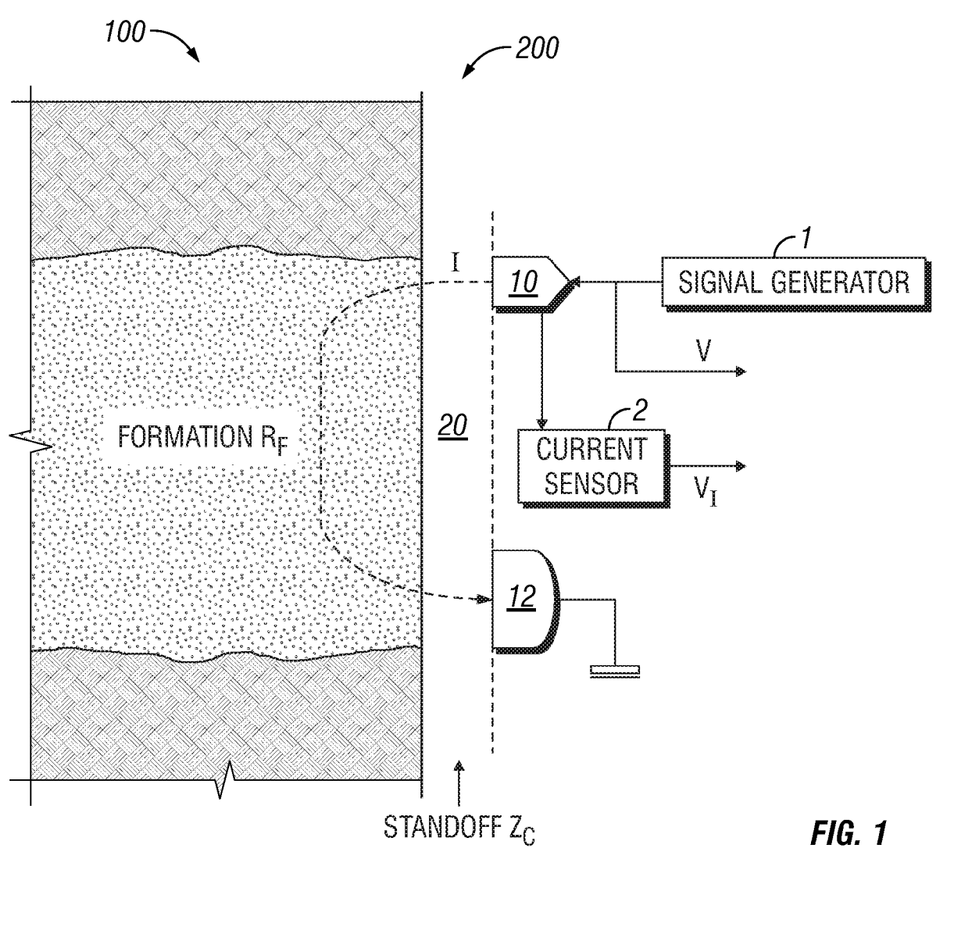
FIG. 1 illustrates a conceptual diagram of a method and system for determination of formation resistivity using direct measurements of amplitude and phase.

FIG. 1 illustrates one example of using electrical earth borehole logging for the determination of formation resistivity, $R_F$. In this example, an earth formation 100 is penetrated by a wellbore 200. Electrodes 10 and 12 are in wellbore 200, in proximity of earth formation 100. Electrode 10 is separated a distance from electrode 12. A standoff zone 20 exists between electrodes 10 and 12 and earth formation 100. Drilling fluids typically reside in wellbore 200, including within standoff zone 20. A current I, having a voltage V, is generated by a signal generator 1 and introduced into formation 100 through electrode 10. Electrode 12 is a ground return. Current I penetrates through standoff zone 20 into formation 100. Standoff zone 20 exhibits a standoff impedance $Z_C$ between electrodes 10 and 12, owing to the electrical characteristics of the drilling fluids. For example, Oil Based Mud (OBM) has a high resistance, causing a capacitive dielectric effect between electrodes 10 and 12. A current sensor 2 detects the current at electrode 10, producing voltage signal $V_I$. A comparison is made of the voltage V from signal generator 1 and the detected current, as represented by voltage signal $V_I$. A measure of the formation resistivity, $R_F$ is determined from this comparison.

Figure 2:
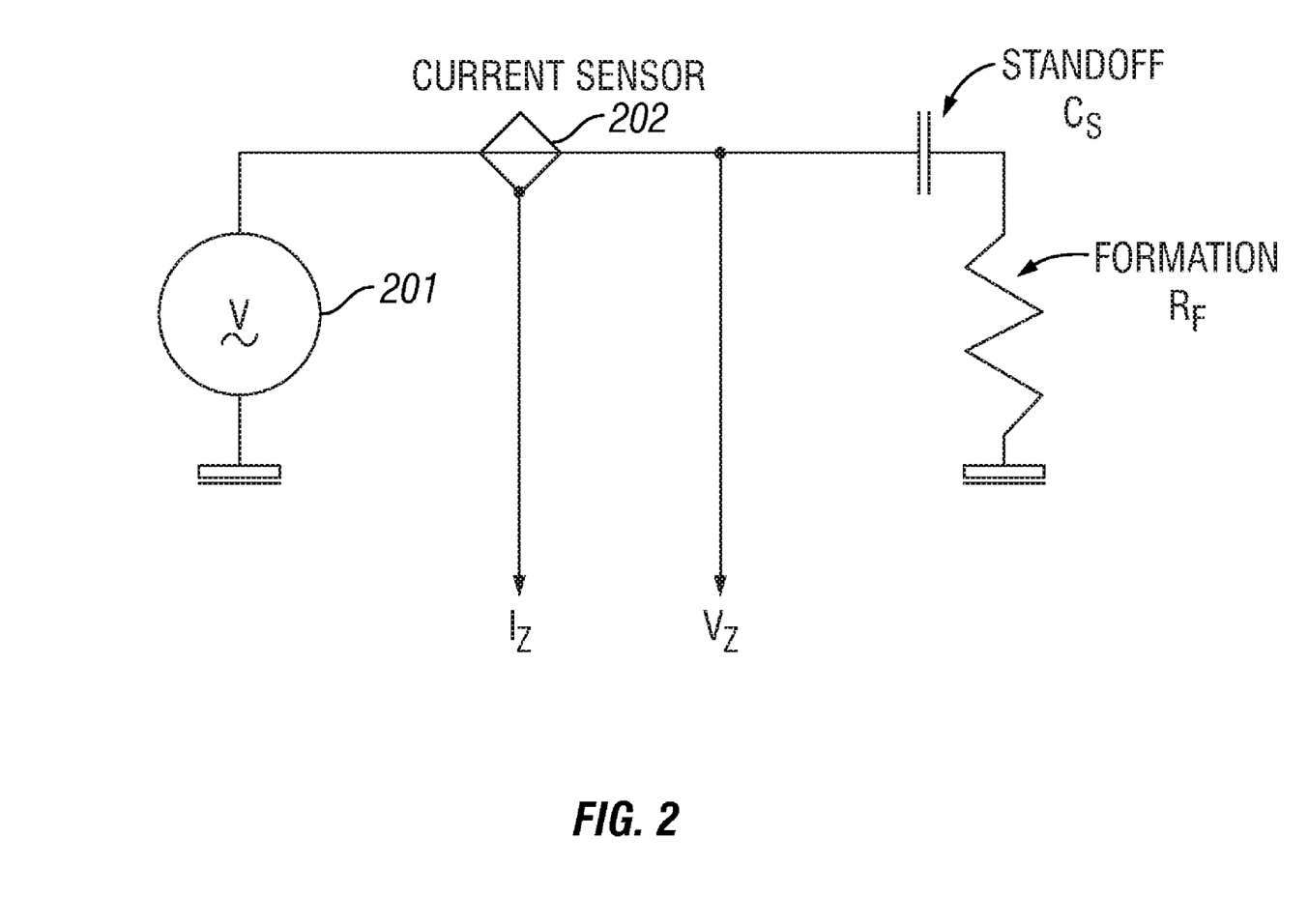
FIG. 2 illustrates an equivalent electrical schematic diagram of a formation undergoing stimulation and measurement.

FIG. 2 illustrates an equivalent electrical schematic diagram of FIG. 1, of a formation undergoing stimulation and measurement. Signal generator 201 stimulates a formation exhibiting a formation resistivity $R_F$. A standoff capacitive effect $C_S$, due to Oil Based Mud and standoff zone 20 (FIG. 1), is electrically in series between the formation resistivity $R_F$ and signal generator 201. Voltage $V_Z$ is measured between signal generator 201 and standoff capacitive effect $C_S$. Current $I_Z$ is sensed between signal generator 201 and standoff capacitive effect $C_S$ by use of current sensor 202.

For Oil Based Mud (OBM), a high frequency driving source has to be used to excite the formation in order to measure the formation resistivity. The simplified impedance model of the Oil Based Mud (OBM) standoff and the formation is:

$$Z = \frac{v_z}{i_z} = Z_R + jZ_C \approx R_F + jZ_C(C_S, \omega) \quad (1)$$

Where Z is the total impedance expressed as a complex number, $v_z$ is observed voltage V, $i_z$ is the observed current I, $Z_R$ is the real component of the total impedance, j is the square root of minus one, Zc is the impedance from the standoff, $R_F$ is formation resistance, $C_S$ is the capacitance of the standoff, and ω is the frequency in radians.

Given ω=2π·10 MHz as a nominal frequency value, the ratio of impedances for the Oil Based Mud (OBM) can range from 20 to 100 or higher, which is $$20 \le \frac{Z_C}{R_F} \le 100 \quad (2)$$

Direct measurements of the amplitude and phase of Z are obtained by comparing the voltage V from the signal generator and the detected current, as represented by voltage signal $V_I$. These direct measurements are then used to calculate $R_F$. For example, a fully integrated RF IC for measuring amplitude and the phase between two independent input signals can be used to compare voltage V and $V_I$. In this example, the $Z_C$ is dominant so that the observed phase is close to 90°. As a result, the resolutions for both amplitude and phase have to be very high to achieve accurate estimation of formation resistivity, $R_F$ using this technique. A method for direct measurement is desired that does not have such a high resolution requirement in order to achieve accurate estimation of formation resistivity, $R_F$.

In practice, it is desired to have in the borehole a plurality of electrodes, forming an array. Each electrode-ground pairing, a channel, provides an opportunity for taking a measurement. Due to a capacitive effect between adjacent electrodes in the array there is a risk of interference, or cross-talking, between adjacent channels. A method for direct measurement is desired that reduces cross-talk in order to take multiple measurements of formation resistivity, $R_F$ using a plurality of electrodes.

SUMMARY OF THE INVENTION

In a first set of examples of the present invention, a method and system are disclosed for measuring formation resisitivity, the method includes the steps of: introducing a Maximum Length Sequence modulated electrical signal into a formation; sensing the current of the introduced electrical signal, whereby an analog formation measured signal is produced; comparing the introduced electrical signal with the formation measured signal in a quadrature demodulation device, whereby an in-phase demodulated signal is produced; and extracting a low frequency portion from the in-phase demodulated signal, whereby an analog measurement related to formation resistivity is produced.

In another example, the method includes the step of converting the analog measurement related to formation resistivity into a digital measurement. In a further example, the method includes the step of averaging successive digital measurements.

In a second set of examples of the present invention, a method and system are disclosed for measuring formation resisitivity, the method includes the steps of: introducing a Maximum Length Sequence modulated electrical signal into a first location of a formation; shifting the phase of the Maximum Length Sequence modulated electrical signal, whereby a phase-shifted Maximum Length Sequence modulated electrical signal is formed; introducing the phase-shifted Maximum Length Sequence modulated electrical signal into a second location of the formation; sensing the current of the introduced electrical signal, whereby a first analog formation measured signal is produced; sensing the current of the introduced phase-shifted electrical signal, whereby a second analog formation measured signal is produced; comparing the introduced electrical signal with the first formation measured signal in a first quadrature demodulation device, whereby a first in-phase demodulated signal is produced; comparing the introduced phase-shifted electrical signal with the second formation measured signal in a second quadrature demodulation device, whereby a second in-phase demodulated signal is produced; extracting a low frequency portion from the first in-phase demodulated signal, whereby a first analog measurement related to formation resistivity is produced; and extracting a low frequency portion from the second in-phase demodulated signal, whereby a second analog measurement related to formation resistivity is produced.

In another example, the method includes the step of converting at least one of the analog measurements related to formation resistivity into a digital measurement. In a further example, the method includes the step of averaging successive digital measurements.

In a third set of examples of the present invention, a system is disclosed for measuring formation resisitivity, the system including: a signal generator having an output for providing a current expressing a Maximum Length Sequence; a first electrode connected to the output of the signal generator; a current sensing device having an input connected to the first electrode and having an output; a ground electrode separated from the first electrode and connected to a ground of the signal generator and connected to a ground of the current sensing device; a quadrature demodulation device having a first input and a second input and an in-phase output, the first input connected to the output of the current sensor and the second input connected to the output of the signal generator; and a low pass filter having an input connected to the in-phase output of the quadrature demodulation device and having an output, whereby an analog measurement related to formation resistivity is produced.

In another example, the system includes an analog-to-digital converter having an analog input connected to the output of the low pass filter and having a digital output, whereby a digital measurement related to formation resistivity is produced. In a further example, the system further includes an integrator connected to the digital output of the analog-to-digital converter.

In another example, the system further includes: a phase shifter having an input connected to the output of the signal generator and having an output; a second electrode, separated from said first electrode, and connected to the output of the phase shifter; a second current sensing device having an input connected to the second electrode and having an output; a second quadrature demodulation device having a first input and a second input and an in-phase output, the first input of the second quadrature demodulation device connected to the output of the second current sensor and the second input of the second quadrature demodulation device connected to the output of the phase shifter; and a second low pass filter having an input connected to the in-phase output of the second quadrature demodulation device and having an output, whereby a second analog measurement related to formation resistivity is produced.

In another example, the system further includes an analog-to-digital converter having an analog input connected to the output of one of the low pass filters and having a digital output, whereby a digital measurement related to formation resistivity is produced. In a further example, the system further includes an integrator connected to the digital output of the analog-to-digital converter.

BRIEF DESCRIPTION OF THE DRAWINGS

The present invention is best understood with reference to the attached drawings in which like numerals refer to like elements, and in which.

DETAILED DESCRIPTION OF THE INVENTION

Figure 3:
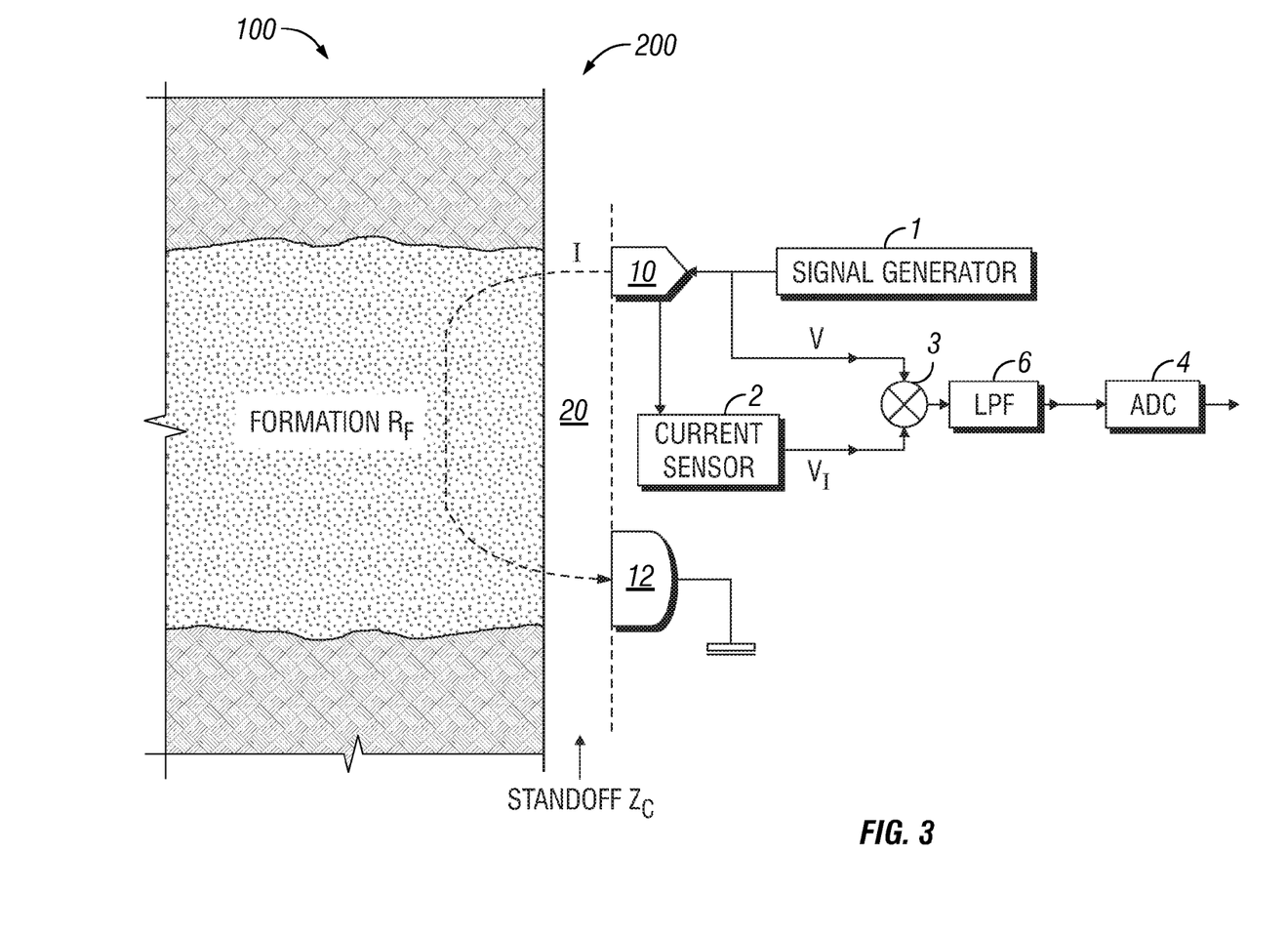
FIG. 3 illustrates a conceptual diagram of a method and system for determination of formation resistivity using coherent analog in-phase demodulation.

FIG. 3 illustrates a conceptual diagram of a method and system for determination of formation resistivity using coherent analog in-phase demodulation. Instead of using direct impedance measurement, a coherent analog in-phase demodulation is used to detect the $R_F$. In this example, a current I is generated by signal generator 1 and introduced into the formation through electrode 10. Electrode 12 is a ground return. Current I penetrates through standoff zone 20 into formation 100. Standoff zone 20 exhibits a standoff impedance $Z_C$, owing to the electrical characteristics of the drilling fluids. Current sensor 2 detects the current at electrode 10, producing voltage signal $V_I$. Integrated Circuit 3 receives the detected current, as represented by voltage signal $V_I$. Integrated circuit 3, for example, is a dual-phase shifter and in-phase/quadrature (I/Q) demodulator that enables coherent summing and phase alignment of multiple analog data channels. An AD8333 (manufactured by Analog Devices, Inc.) is an example of such an integrated circuit. Integrated circuit 3 also receives voltage V from signal generator 1, which is also referred to as a base signal or a coherent reference, enabling comparison of voltage signal $V_I$ with voltage V from signal generator 1. Voltage V from signal generator 1 therefore acts as a coherent reference to voltage signal $V_I$. Both Voltage V and voltage signal $V_I$ are analog signals. Integrated circuit 3 acts as a quadrature demodulation device and is used for in-phase demodulation which rejects the quadrature component. The quadrature component, or common mode signal, is mainly caused by the standoff capacitance, Cs. Integrated circuit 3 outputs the in-phase component of the comparison to low pass filter 6. Low pass filter 6 receives the in-phase component from integrated circuit 3 and passes the low frequency portion of the in-phase component as a quasi-DC signal for output to analog-to-digital converter 4. Analog-to-digital converter 4 receives the quasi-DC signal from low pass filter 6 and converts the quasi-DC in-phase signal into a digital value, producing a direct measure of formation resistivity, $R_F$. In one example, the formation resistivity, $R_F$ is digitized in 8 to 10 bits, which provides enough Signal-to-Noise Ratio (SNR) for image quality.

Figure 4A:
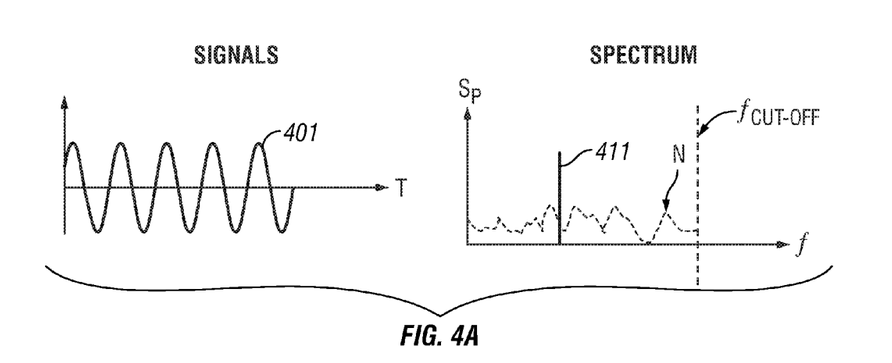
FIG. 4A illustrates a graph of a sinusoidal signal for generation by a signal generator and the corresponding graph of the spectral response of the sinusoidal signal.

FIG. 4A illustrates a graph of a sinusoidal signal for generation by a signal generator and the corresponding graph of the spectral response of the sinusoidal signal. Sinusoidal signal 401 is shown varying in amplitude along the y-axis with time T referenced along the x-axis. Spectral response 411 of sinusoidal signal 401 is shown on the corresponding spectral response graph, with the y-axis representing spectral power Sp and the x-axis representing frequency f. A frequency cutoff $f_{CUT-OFF}$ is shown by a vertical dashed line. Spectral response 411 represents a concentration of spectral energy at a single frequency for sinusoidal signal 401 and appears as a spike on the spectral response graph. Noise floor N represents residual spectral power at various frequencies, relative to spectral response 411. The sinusoidal signal exhibits a baseline signal-to-noise ratio, a baseline complexity to generate and receive, but exhibits relatively poor power efficiency.

Figure 4B:
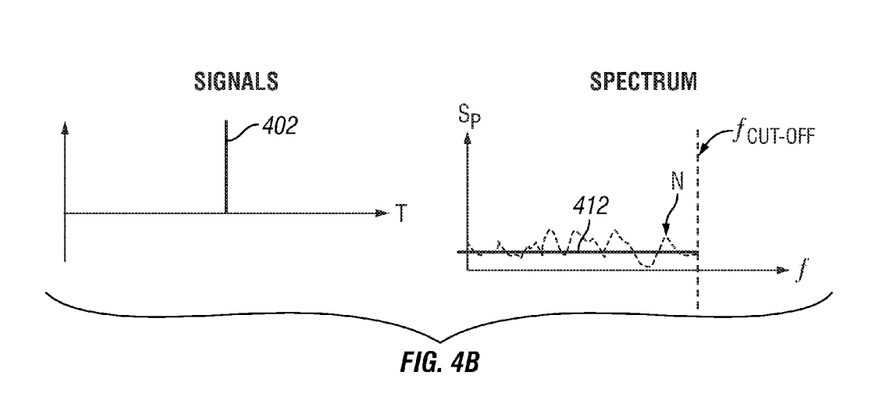
FIG. 4B illustrates a graph of a non-sinusoidal impulse signal for generation by a signal generator and the corresponding graph of the spectral response of the non-sinusoidal impulse signal.

FIG. 4B illustrates a graph of a non-sinusoidal impulse signal for generation by a signal generator and the corresponding graph of the spectral response of the non-sinusoidal impulse signal. Non-sinusoidal impulse signal 402 is shown varying in amplitude along the y-axis with time T referenced along the x-axis. Spectral response 412 of non-sinusoidal impulse signal 402 is shown on the corresponding spectral response graph, with the y-axis representing spectral power Sp and the x-axis representing frequency f. A frequency cutoff $f_{CUT-OFF}$ is shown by a vertical dashed line. Spectral response 412 represents a wide band of spectral energy across the frequencies for non-sinusoidal impulse signal 402 and appears as a flat horizontal line across the spectral response graph. Noise floor N represents residual spectral power at various frequencies, at a magnitude comparably relative to spectral response 412. The impulse signal exhibits a relatively poor signal-to-noise ratio, a relatively low complexity to generate and receive, and relatively good power efficiency.

Figure 4C:
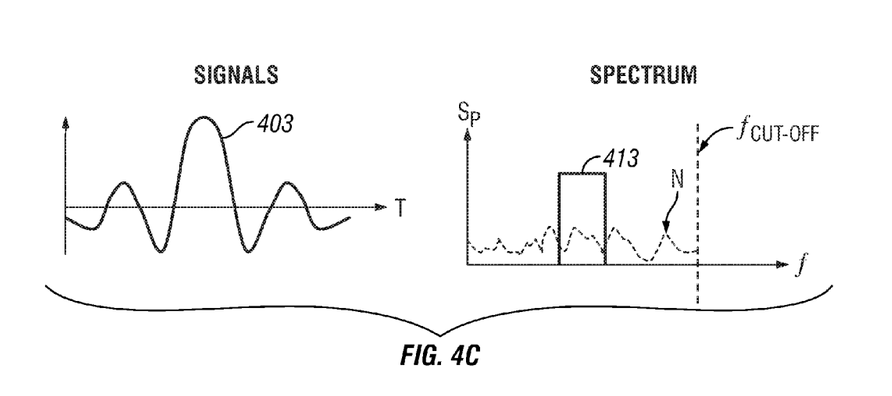
FIG. 4C illustrates a graph of a non-sinusoidal sinc signal for generation by a signal generator and the corresponding graph of the spectral response of the non-sinusoidal sinc signal.

FIG. 4C illustrates a graph of a non-sinusoidal sinc signal for generation by a signal generator and the corresponding graph of the spectral response of the non-sinusoidal sinc signal. Non-sinusoidal sinc signal 403 is shown varying in amplitude along the y-axis with time T referenced along the x-axis. Spectral response 413 of non-sinusoidal sinc signal 403 is shown on the corresponding spectral response graph, with the y-axis representing spectral power Sp and the x-axis representing frequency f. A frequency cutoff $f_{CUT-OFF}$ is shown by a vertical dashed line. Spectral response 413 represents a band of spectral energy across a limited range of frequencies for non-sinusoidal sinc signal 403 and appears as a flat boxcar on the spectral response graph. Noise floor N represents residual spectral power at various frequencies, relative to spectral response 413. The sinc signal exhibits a relatively good signal-to-noise ratio, a relatively high complexity to generate and receive, but has a relatively poor power efficiency.

Figure 4D:
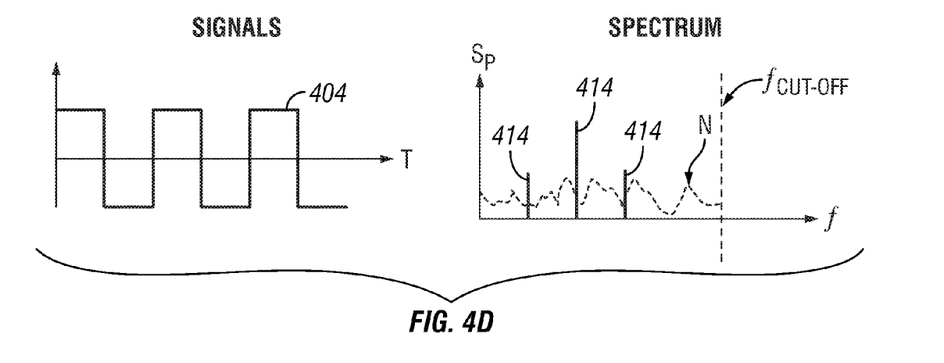
FIG. 4D illustrates a graph of a non-sinusoidal square wave signal for generation by a signal generator and the corresponding graph of the spectral response of the non-sinusoidal square wave signal.

FIG. 4D illustrates a graph of a non-sinusoidal square wave signal for generation by a signal generator and the corresponding graph of the spectral response of the non-sinusoidal square wave signal. Non-sinusoidal square wave signal 404 is shown varying in amplitude along the y-axis with time T referenced along the x-axis. Spectral response 414 of non-sinusoidal square wave signal 404 is shown on the corresponding spectral response graph, with the y-axis representing spectral power Sp and the x-axis representing frequency f. A frequency cutoff $f_{CUT-OFF}$ is shown by a vertical dashed line. Spectral response 414 represents a plurality of spikes at various frequencies for non-sinusoidal square wave signal 404 and appears as a flat boxcar on the spectral response graph. Noise floor N represents residual spectral power at various frequencies, relative to spectral response 414. The square wave signal exhibits a relatively better signal-to-noise ratio, a relatively low complexity to generate and receive, and has a relatively good power efficiency.

Figure 4E:
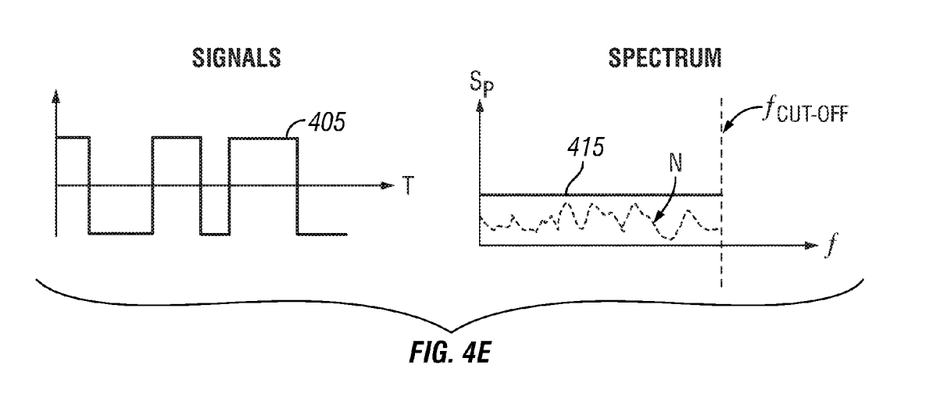
FIG. 4E illustrates a graph of a non-sinusoidal spread-spectrum signal for generation by a signal generator and the corresponding graph of the spectral response of the non-sinusoidal spread-spectrum signal.

FIG. 4E illustrates a graph of a non-sinusoidal spread-spectrum signal for generation by a signal generator and the corresponding graph of the spectral response of the non-sinusoidal spread-spectrum signal. A spread-spectrum signal is also referenced as continuous phase modulation. Non-sinusoidal spread-spectrum signal 405 is shown varying in amplitude along the y-axis with time T referenced along the x-axis. Spectral response 415 of non-sinusoidal spread-spectrum signal 405 is shown on the corresponding spectral response graph, with the y-axis representing spectral power Sp and the x-axis representing frequency f. A frequency cutoff $f_{CUT-OFF}$ is shown by a vertical dashed line. Spectral response 415 represents a wide band of spectral energy across the frequencies for non-sinusoidal spread-spectrum signal 405 and appears as a flat horizontal line across the spectral response graph. Noise floor N represents residual spectral power at various frequencies, at a magnitude comparably lower than spectral response 415. The spread-spectrum signal exhibits a relatively high signal-to-noise ratio, a moderate complexity to generate and receive, and has a relatively good power efficiency.

From the comparison of various signal modulation techniques, spread spectrum (continuous phase) modulation provides relatively better data communication characteristics over several other forms of modulation.

Figure 5:
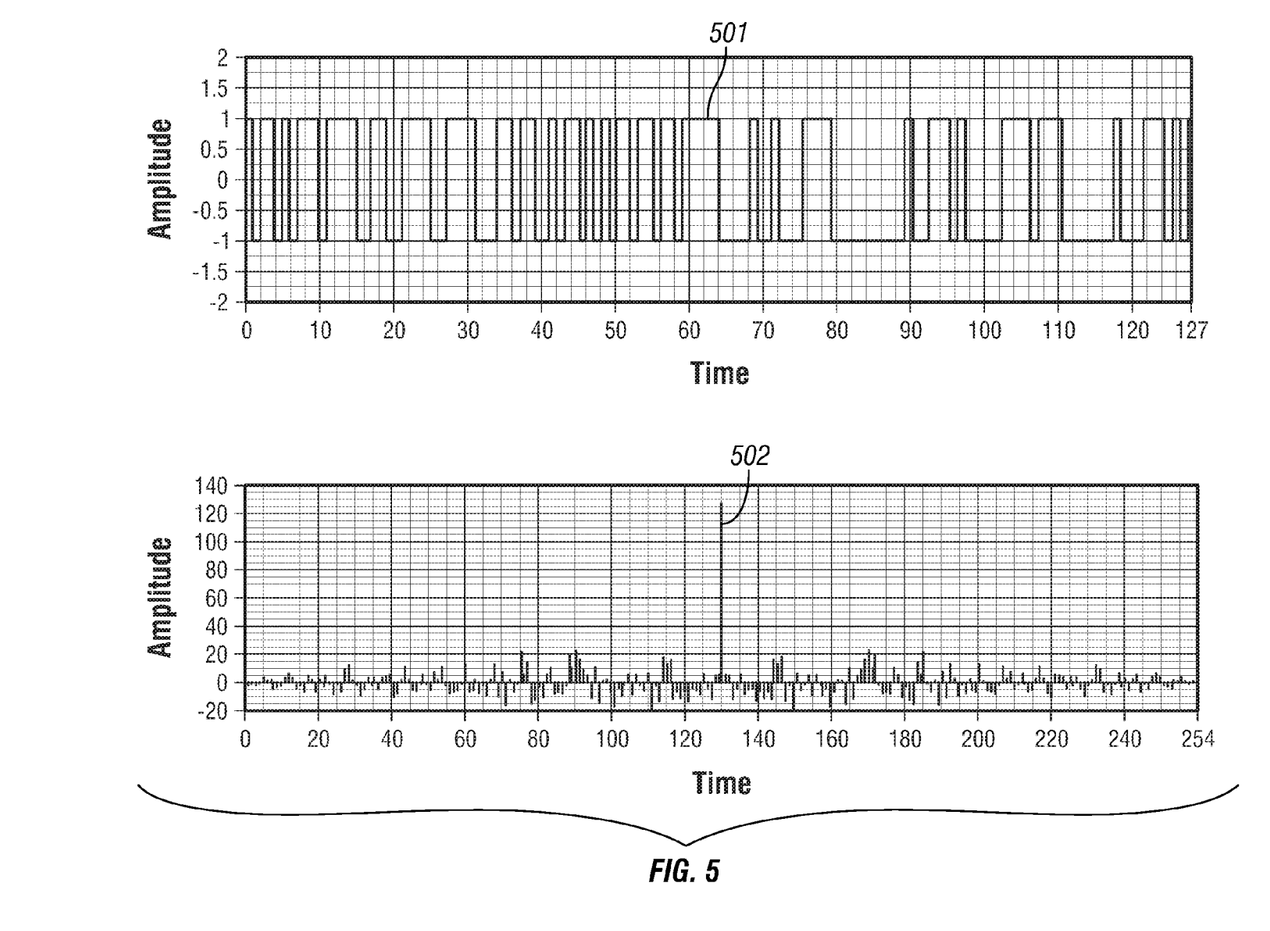
FIG. 5 illustrates a graph of a Maximum Length Sequence spread-spectrum signal for generation by a signal generator and the corresponding graph of the autocorrelation coefficient of the Maximum Length Sequence spread-spectrum signal.

FIG. 5 illustrates a graph of a Maximum Length Sequence spread-spectrum signal for generation by a signal generator and the corresponding graph of the autocorrelation coefficient of the Maximum Length Sequence spread-spectrum signal. A Maximum Length Sequence is a train of boxcar pulses where the information is carried in the duration of the each boxcar. In the example as illustrated in FIG. 5, train 501 is a Maximum Length Sequence of one hundred and twenty-eight (128) pulse time slots. The sequence begins at the zero time slot value and finishes at the one-hundred-twenty-seven (127) time slot value. The amplitude of train 501 is shown along the y-axis with time slot values referenced along the x-axis. An autocorrelation 502 of train 501 produces a very strong spike at zero shift and very little correlation at any other shift. Since the autocorrelation is extremely strong for Maximum Length Sequence signals, a slight phase shift in a Maximum Length Sequence signal will result in a dramatic drop in correlation. In one example, a phase shift in a Maximum Length Sequence signal is accomplished by rotating the pulse time slots, for instance, by starting the sequence at other than the zero time slot value, advancing through the time slot values to the one-hundred-twenty-seven (127) time slot value, continuing with the zero time slot value, and finishing with the time slot value just preceding the starting time slot value.

In measurement of formation resistivity using Maximum Length Sequence modulation, the impedance detection sensitivity requirements determine the smallest practical pulse interval. In one example, for Oil Based Mud (OBM) the base pulse frequency is selected between 2 MHz and 50 MHz (0.5 microseconds and 20 nanoseconds). An approximate 16 dB improvement in signal-to-noise ratio is theoretically achievable due to the lack of correlation between a Maximum Length Sequence signal and random noise. In another example, multiple broadcasts of the Maximum Length Sequence signal are received and averaged in the digital domain, further improving the signal-to-noise ratio.

Figure 6:
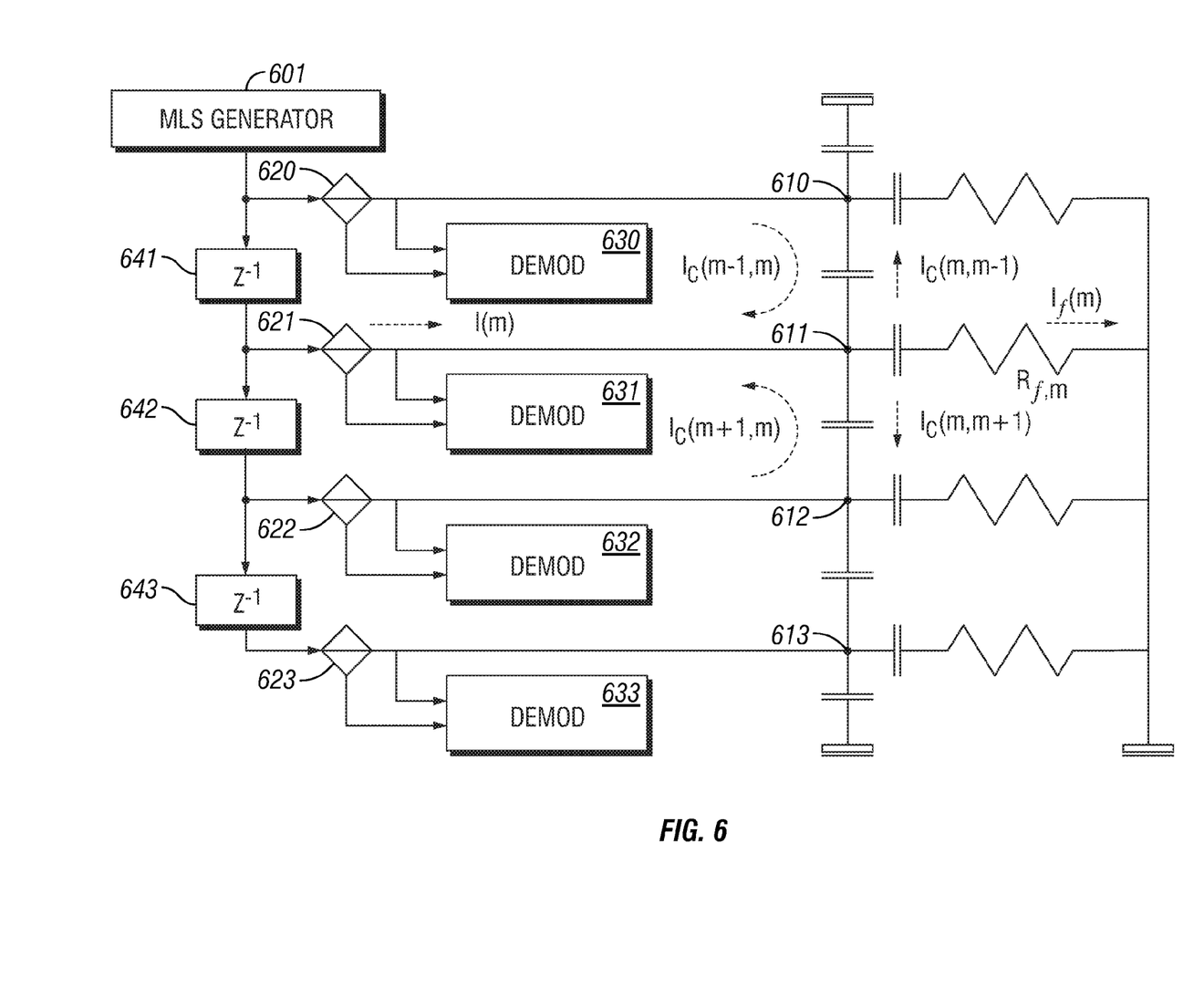
FIG. 6 illustrates an equivalent electrical schematic diagram of a method and system for determination of formation resistivity using a plurality of electrodes and a Maximum Length Sequence modulated signal.

FIG. 6 illustrates an equivalent electrical schematic diagram of a method and system for determination of formation resistivity using a plurality of electrodes and a Maximum Length Sequence modulated signal. Instead of using direct impedance measurement, a coherent analog in-phase demodulation is used to detect values for $R_F$. In this example, a current is generated by signal generator 601 and introduced into the formation through an electrode at node 610. The current generated by signal generator 601 is phase-shifted by shifter 641. The output signal from shifter 641 is introduced into the formation through an electrode at node 611. As illustrated in this example, additional phase shifting is performed by shifters 642 and 643 with the outputs introduced into the formation through electrodes 612 and 613, respectfully. The Maximum Length Sequence modulated signal is thereby introduced into the formation at various locations, with a particular phase-shift of the signal introduced at each location.

The measurement of formation resistivity $R_f$, m at node 611 further illustrates the various electrical contributions occurring during overall stimulation and measurement. The phase-shifted Maximum Length Sequence modulated signal from shifter 641, and introduced at node 611, represents a signal voltage and current I(m). Current sensor 621 detects the current at node 611, producing a voltage that represents the detected current I(m). Demodulation device 631 receives from current sensor 621 the voltage that represents the detected current. Demodulation device 631 also receives the signal voltage from shifter 641, enabling comparison of the signal voltage with the voltage that represents the detected current. An AD8343 (a high-performance broadband active mixer manufactured by Analog Devices, Inc.) is an example of such an integrated circuit. Various factors contribute to current I(m):

$$I(m) = I_f(m) + I_c(m, m-1) + I_c(m, m+1) - I_c(m-1, m) - I_c(m+1, m) \quad (3)$$

where I(m) is the detected current for node 611, $I_f(m)$ is the formation current for node 611, $I_c(m,m-1)$ is the leakage (or "cross-talking") current between nodes 610 and 611, $I_c(m, m+1)$ is the leakage current between nodes 611 and 612, $I_c(m-1,m)$ is the diffusion current between nodes 610 and 611, and $I_c(m+1,m)$ is the diffusion current between nodes 611 and 612. Both the diffusion currents and the cross-talking currents are caused by voltage differences corresponding to the different voltage driving signals when no equal-potential adjustment occurs. However, the in-phase demodulator rejects cross-talking current interferences owing to the dramatic lack of correlation between phase-shifted Maximum Length Sequence signals.

Figure 7:
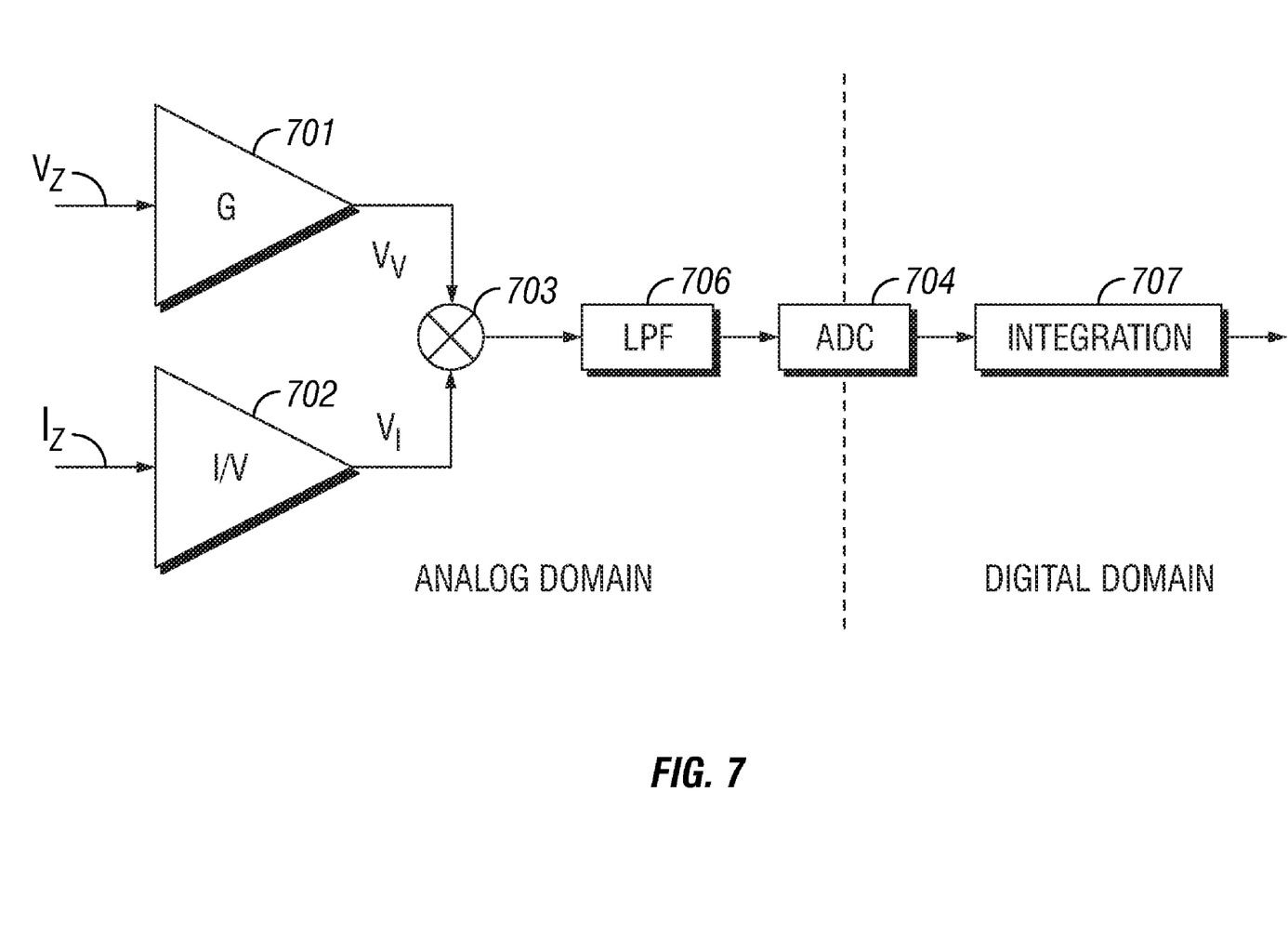
FIG. 7 illustrates a conceptual diagram of a method and system for determination of formation resistivity using coherent analog in-phase demodulation with integration in the digital domain.

FIG. 7 illustrates a conceptual diagram of a method and system for determination of formation resistivity using coherent analog in-phase demodulation with integration in the digital domain. In this example, the introduced voltage Vz and measured current Iz are collected from a signal generator that is connected to a node (not illustrated). Voltage Vz passes through a gain amplifier 701 to produce a voltage $V_V$. Current Iz is sensed by a current-to-voltage circuit 702 to produce voltage signal $V_I$. Demodulation device 703 receives the detected current, as represented by voltage signal $V_I$. Demodulation device 703 also receives voltage $V_V$, which is also referred to as a base signal or a coherent reference, enabling comparison of voltage signal $V_I$ with voltage $V_V$. Both Voltage $V_V$ and voltage signal $V_I$ are analog signals. Demodulation device 703 acts as a quadrature demodulation device and is used for in-phase demodulation which rejects the quadrature component. Demodulation device 703 outputs the in-phase component of the comparison to low pass filter 706. Low pass filter 706 receives the in-phase component from demodulation device 703 and passes the low frequency portion of the in-phase component as a quasi-DC signal for output to analog-to-digital converter 704. Analog-to-digital converter 704 receives the quasi-DC signal from low pass filter 706 and converts the quasi-DC in-phase signal into a digital value. Multiple broadcasts from the signal generator result in production of a succession of digital values by analog-to-digital converter 704. A digital integrator 707 sums the succession of digital values to produce an averaged value for formation resistivity in the digital domain, further improving the signal-to-noise ratio.

It is to be understood that the selection of particular computer system hardware and software is not believed to be of particular relevance to the understanding and practice of the invention, so long as it meets the general criteria just stated. Those of ordinary skill in the art will undoubtedly be aware of numerous computer systems, hardware, associated application software, and/or combinations thereof suitable for the purposes of practicing the invention as disclosed herein.

In at least one example, the processing of the data is accomplished by a downhole processor. In at least one example, the processing of the data is accomplished by a surface processor. Implicit in the control and processing of the data is the use of a computer program implemented on a suitable machine-readable medium that enables the processor to perform the control and processing. The machine-readable medium may include ROMs, EPROMs, EAROMs, flash memories and/or optical disks.

The foregoing disclosure is presented for purposes of illustration and description, and is not intended to limit the invention to the forms disclosed herein. Consequently, variations and modifications commensurate with the above disclosures and the disclosure of the relevant art are within the spirit of the invention. Such variations will readily suggest themselves to those skilled in the relevant art. Further, the examples described are also intended to explain the best mode for carrying out the invention, and to enable others skilled in the art to utilize the invention and such or other embodiments and with various modifications required by the particular applications or uses of the invention. It is intended that the appended claims be construed to include alternative embodiments to the extent that is permitted by prior art.

I claim:

1. A method for measuring formation resisitivity, the method comprising the steps of:
   introducing a Maximum Length Sequence modulated electrical signal into a formation;
   sensing the current of the introduced electrical signal, whereby an analog formation measured signal is produced;
   comparing the introduced electrical signal with the formation measured signal in a quadrature demodulation device, whereby an in-phase demodulated signal is produced; and
   extracting a low frequency portion from the in-phase demodulated signal, whereby an analog measurement related to formation resistivity is produced.

2. The method of claim 1, further comprising the step of:
   converting said analog measurement related to formation resistivity into a digital measurement.

3. The method of claim 2, further comprising the step of:
   averaging successive digital measurements.

4. A method for measuring formation resisitivity, the method comprising the steps of:
   introducing a Maximum Length Sequence modulated electrical signal into a first location of a formation;
   shifting the phase of the Maximum Length Sequence modulated electrical signal, whereby a phase-shifted Maximum Length Sequence modulated electrical signal is formed;
   introducing the phase-shifted Maximum Length Sequence modulated electrical signal into a second location of the formation;
   sensing the current of the introduced electrical signal, whereby a first analog formation measured signal is produced;
   sensing the current of the introduced phase-shifted electrical signal, whereby a second analog formation measured signal is produced;
   comparing the introduced electrical signal with the first formation measured signal in a first quadrature demodulation device, whereby a first in-phase demodulated signal is produced;
   comparing the introduced phase-shifted electrical signal with the second formation measured signal in a second quadrature demodulation device, whereby a second in-phase demodulated signal is produced;
   extracting a low frequency portion from the first in-phase demodulated signal, whereby a first analog measurement related to formation resistivity is produced; and
   extracting a low frequency portion from the second in-phase demodulated signal, whereby a second analog measurement related to formation resistivity is produced.

5. The method of claim 4, further comprising the step of:
   converting at least one of said first and said second analog measurements related to formation resistivity into a digital measurement.

6. The method of claim 5, further comprising the step of:
   averaging successive digital measurements.

7. A system for measuring formation resistivity, the system comprising:
   a signal generator having an output for providing a current expressing a Maximum Length Sequence;
   a first electrode connected to the output of the signal generator;
   a current sensing device having an input connected to the first electrode and having an output;
   a ground electrode separated from the first electrode and connected to a ground of the signal generator and connected to a ground of the current sensing device;
   a quadrature demodulation device having a first input and a second input and an in-phase output, the first input connected to the output of the current sensor and the second input connected to the output of the signal generator; and
   a low pass filter having an input connected to the in-phase output of the quadrature demodulation device and having an output, whereby an analog measurement related to formation resistivity is produced.

8. The system of claim 7, further comprising:
   an analog-to-digital converter having an analog input connected to the output of the low pass filter and having a digital output, whereby a digital measurement related to formation resistivity is produced.

9. The system of claim 8, further comprising:
   an integrator connected to the digital output of the analog-to-digital converter.

10. The system of claim 7, further comprising:
    a phase shifter having an input connected to the output of the signal generator and having an output;
    a second electrode, separated from said first electrode, and connected to the output of the phase shifter;
    a second current sensing device having an input connected to the second electrode and having an output;
    a second quadrature demodulation device having a first input and a second input and an in-phase output, the first input of the second quadrature demodulation device connected to the output of the second current sensor and the second input of the second quadrature demodulation device connected to the output of the phase shifter; and
    a second low pass filter having an input connected to the in-phase output of the second quadrature demodulation device and having an output, whereby a second analog measurement related to formation resistivity is produced.

11. The system of claim 10, further comprising:
    an analog-to-digital converter having an analog input connected to the output of at least one of said first and said second low pass filters and having a digital output, whereby a digital measurement related to formation resistivity is produced.

12. The system of claim 11, further comprising:
    an integrator connected to the digital output of the analog-to-digital converter.

* * * * *